United States Patent
Kim

(10) Patent No.: US 12,456,324 B2
(45) Date of Patent: Oct. 28, 2025

(54) ELECTRONIC DEVICE INCLUDING A PLURALITY OF OPTICAL FINGERPRINT SENSORS, METHOD FOR ACQUIRING AND AUTHENTICATING FINGERPRINT INFORMATION IN THE SAME

(71) Applicant: Samsung Electronics Co., Ltd., Suwon-si (KR)

(72) Inventor: Jinho Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 399 days.

(21) Appl. No.: 17/967,355

(22) Filed: Oct. 17, 2022

(65) Prior Publication Data

US 2023/0114698 A1    Apr. 13, 2023

Related U.S. Application Data

(63) Continuation of application No. PCT/KR2022/014192, filed on Sep. 22, 2022.

(30) Foreign Application Priority Data

Oct. 13, 2021   (KR) .......................... 10-2021-0135866

(51) Int. Cl.
*G06V 40/00*        (2022.01)
(52) U.S. Cl.
CPC .................................... *G06V 40/00* (2022.01)
(58) Field of Classification Search
None
See application file for complete search history.

(56) References Cited

U.S. PATENT DOCUMENTS 10,769,407 B2 *  9/2020  Feng ................. G06V 40/1376
11,010,581 B2    5/2021  Chung
(Continued)

FOREIGN PATENT DOCUMENTS

CN         109328349 A      2/2019
KR      10-2018-0086086 A   7/2018
(Continued)

OTHER PUBLICATIONS

Nakagawa, T., & Uwano, H. (Oct. 2012). Usability differential in positions of software keyboard on smartphone. In The 1st IEEE Global Conference on Consumer Electronics 2012 (pp. 304-308). IEEE. (Year: 2012).*

(Continued)

*Primary Examiner* — Ian L Lemieux
(74) *Attorney, Agent, or Firm* — Jefferson IP Law, LLP

(57) ABSTRACT

An electronic device is provided. The electronic device includes a display, a first fingerprint sensor, a second fingerprint sensor, a memory, and a processor configured to acquire a first fingerprint image corresponding to an external object requesting fingerprint authentication through the first fingerprint sensor, acquire a second fingerprint image corresponding to the external object through the second fingerprint sensor, produce a phase image based on a differential component of an area in which the first fingerprint image and the second fingerprint image overlap, identify whether the external object is a stereoscopic pattern having a three-dimensional shape through the phase image, identify whether at least one of the first fingerprint image or the second fingerprint image matches with registered user fingerprint authentication data, and when the external object is a stereoscopic pattern and the registered fingerprint authentication data is matched, succeed in the fingerprint authentication for the external object.

18 Claims, 11 Drawing Sheets

(56) References Cited

U.S. PATENT DOCUMENTS

| | | | |
|---|---|---|---|
| 11,068,693 B1* | 7/2021 | Alassafi | G06V 10/44 |
| 11,238,264 B2* | 2/2022 | Reinhold | G06V 40/1359 |
| 11,348,376 B2 | 5/2022 | Park et al. | |
| 2010/0066954 A1* | 3/2010 | Wang | G02F 1/133514 |
| | | | 349/106 |
| 2015/0161432 A1* | 6/2015 | Yoshida | G06V 40/1359 |
| | | | 382/125 |
| 2016/0188950 A1 | 6/2016 | Liu et al. | |
| 2018/0068160 A1* | 3/2018 | Wu | G06V 20/64 |
| 2018/0260602 A1 | 9/2018 | He et al. | |
| 2019/0042721 A1* | 2/2019 | Yamamoto | G06F 21/32 |
| 2019/0057237 A1 | 2/2019 | Zuo et al. | |
| 2019/0213381 A1 | 7/2019 | Lee et al. | |
| 2019/0327393 A1* | 10/2019 | Yang | H04N 5/2226 |
| 2020/0057899 A1* | 2/2020 | Chung | G06V 40/10 |
| 2020/0218867 A1 | 7/2020 | Gandolfo | |
| 2020/0387687 A1* | 12/2020 | Chung | G06V 40/1318 |
| 2021/0004562 A1* | 1/2021 | Chiang | G06V 40/45 |
| 2021/0124892 A1 | 4/2021 | De Foras et al. | |
| 2021/0133423 A1 | 5/2021 | Zhang et al. | |
| 2021/0151511 A1 | 5/2021 | Kim et al. | |
| 2022/0350983 A1* | 11/2022 | Wan | G02B 5/26 |

FOREIGN PATENT DOCUMENTS

| | | |
|---|---|---|
| KR | 10-2019-0031416 A | 3/2019 |
| KR | 10-2020638 B1 | 11/2019 |
| KR | 10-2057568 B1 | 12/2019 |
| KR | 10-2020-0069105 A | 6/2020 |
| KR | 10-2021-0106122 A | 8/2021 |

OTHER PUBLICATIONS

Anonymous. Smartphone. Wikipedia. [online] [retrieved on Jun. 6, 2025] <URL:https://en.wikipedia.org/wiki/Smartphone> (Year: 2025).*
International Search Report dated Jan. 4, 2023, issued in International Application No. PCT/KR2022/014192.

* cited by examiner

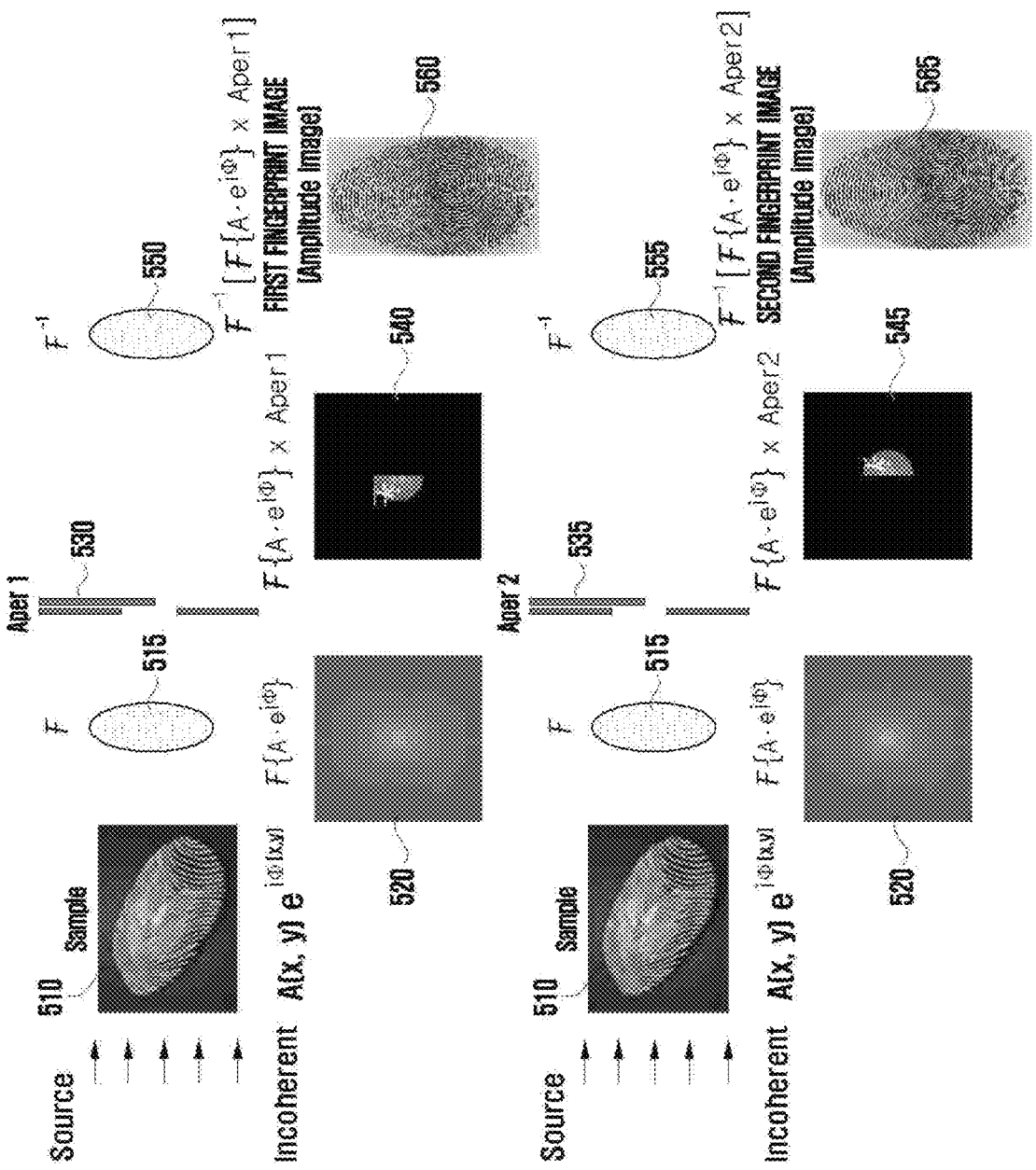

(A) Real Finger (3D)

(B) 2D spoof

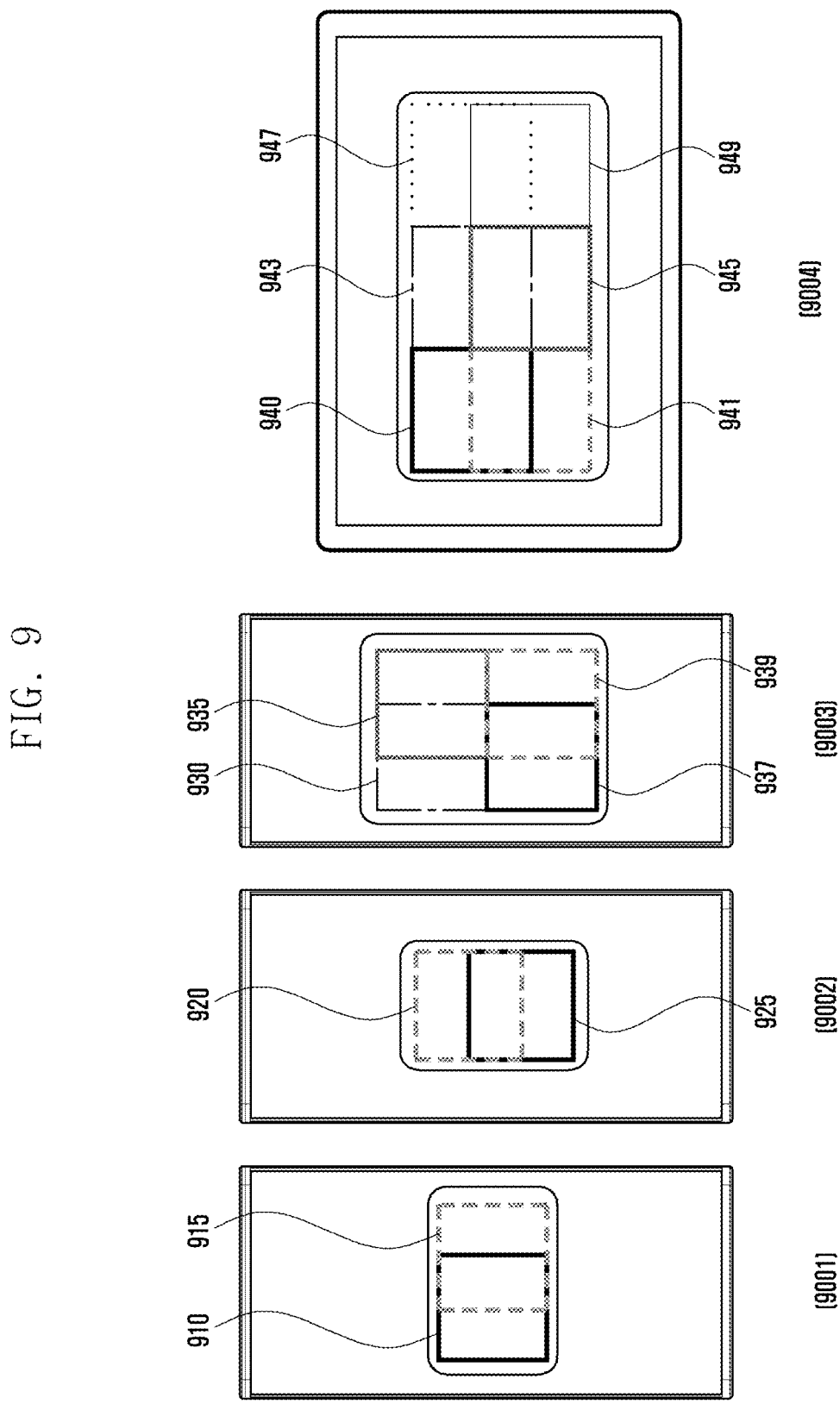

ELECTRONIC DEVICE INCLUDING A PLURALITY OF OPTICAL FINGERPRINT SENSORS, METHOD FOR ACQUIRING AND AUTHENTICATING FINGERPRINT INFORMATION IN THE SAME

CROSS-REFERENCE TO RELATED APPLICATION(S)

This application is a continuation application, claiming priority under § 365 (c), of an International application No. PCT/KR2022/014192, filed on Sep. 22, 2022, which is based on and claims the benefit of a Korean patent application number 10-2021-0135866, filed on Oct. 13, 2021, in the Korean Intellectual Property Office, the disclosure of which is incorporated by reference herein in its entirety.

BACKGROUND

1. Field

The disclosure relates to an electronic device including multiple optical fingerprint sensors, and a method for acquiring and authenticating fingerprint information thereby.

2. Description of Related Art

Electronic devices provide functions for authenticating users by using users' biometric information in an effort to enhance security. The biometric information may include, for example, users' biometric characteristics such as fingerprints, irises, voices, faces, or blood vessels. The fingerprint recognition function is the most widely used biometric authentication technology, a user's fingerprint image may be acquired through a fingerprint sensor, and the acquired user fingerprint image may be compared with a pre-registered fingerprint image, thereby recognizing the user authenticated according to the result.

Recently, full front screen type electronic devices that use the entire front surface as a display have become commercially available, and tend to be equipped with a display-based fingerprint recognition function (for example, fingerprint on display (FOD) or in-display fingerprint).

An electronic device may have a fingerprint recognition sensor disposed inside the display (or lower end, under panel), and may recognize a fingerprint contacting or touching the display front surface (for example, display screen) in the area in which the fingerprint recognition sensor is disposed.

Display-based fingerprint recognition functions use optical type fingerprint sensors.

An optical fingerprint sensor may operate in the following manner: a display (or display light source, light-emitting element) corresponding to a fingerprint measurement area is turned on; light is emitted to an external object (or user's finger, fingerprint, sample) and is reflected; the reflected light is collected through a focusing element such as a lens or a collimator; and a difference in the degree of reflection, depending on the type of ridge/valley of the fingerprint, is sensed, thereby acquiring a fingerprint image.

However, the optical detector included in the optical fingerprint sensor only senses the difference in amplitude of light reaching the light receiver and, fundamentally, cannot sense information regarding the phase of reflected light. This may cause security vulnerability.

For example, the optical detector cannot distinguish whether a difference in the amount of light is caused by a difference in curvature (or depth) such as the ridge/valley of an actual fingerprint of a finger, or the difference in the amount of light is caused by a two dimensional (2D) printed image which is obtained by outputting a fingerprint image on two-dimensional paper, and which has a different degree of reflection. As a result, when a 2D printed image and an actual finger are recognized through the optical fingerprint sensor, the fingerprint on the finger having a three dimensional (3D) stereoscopic pattern and the fingerprint on the 2D printed image may be sensed identical, thereby posing a risk of forgery.

An electronic device including an optical fingerprint sensor and a method according to various embodiments may acquire not only information regarding the intensity of the amount of light (for example, amplitude image) on a fingerprint surface, but also information regarding the curvature (for example, phase image) of the fingerprint surface, thereby providing a fingerprint authentication scheme having enhanced security.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device including multiple optical fingerprint sensors, and a method for acquiring and authenticating fingerprint information thereby.

Additional aspects will be set forth in part in the description which follows and, in part, will be apparent from the description, or may be learned by practice of the presented embodiments.

In accordance with an aspect of the disclosure, an electronic device is provided. The electronic device includes a display, a first fingerprint sensor disposed at the lower end of the display and comprising a first aperture configured to filter light with a first component, a second fingerprint sensor disposed to have a second sensing area at least partially overlapping a first sensing area of the first fingerprint sensor, and comprising a second aperture configured to filter light with a second component complementary to the first component, a memory and a processor operatively connected to the display, the first fingerprint sensor, the second fingerprint sensor, and the memory, wherein the memory stores instructions configured to cause the processor to acquire a first fingerprint image corresponding to an external object requesting fingerprint authentication through the first fingerprint sensor, to acquire a second fingerprint image corresponding to the external object through the second fingerprint sensor, to produce a phase image based on a differential component of an area in which the first fingerprint image and the second fingerprint image overlap and identify whether the external object is a stereoscopic pattern having a three-dimensional shape through the phase image, to identify whether at least one of the first fingerprint image and the second fingerprint image matches with registered user fingerprint authentication data, and when a condition that the external object is a stereoscopic pattern and a condition that the registered fingerprint authentication data is matched with are all satisfied, to succeed in the fingerprint authentication for the external object.

In accordance with another aspect of the disclosure, a method for acquiring and authenticating fingerprint information by an electronic device comprising multiple optical fingerprint sensors is provided. The method includes acquiring a first fingerprint image corresponding to an external object requesting fingerprint authentication through a first fingerprint sensor disposed at the lower end of a display and comprising a first aperture configured to filter light with a first component, acquiring a second fingerprint image corresponding to the external object requesting fingerprint authentication through a second fingerprint sensor disposed to have a second sensing area at least partially overlapping a first sensing area of the first fingerprint sensor and comprising a second aperture configured to filter light with a second component complementary to the first component, producing a phase image based on a differential component of an area in which the first fingerprint image and the second fingerprint image overlap, identifying whether the external object is a stereoscopic pattern having a three-dimensional shape through the phase image, identifying whether at least one of the first fingerprint image and the second fingerprint image matches with registered user fingerprint authentication data and when a condition that the external object is a stereoscopic pattern and a condition that the registered fingerprint authentication data is matched with are all satisfied, succeeding in the fingerprint authentication for the external object.

According to various embodiments, multiple optical fingerprint sensors filtered into complementary components may be used to acquire not only information regarding the intensity of the amount of light (for example, amplitude image) on a fingerprint surface, but also information regarding the curvature (for example, phase image) of the fingerprint surface.

According to various embodiments, multiple optical fingerprint sensors may be used such that a fingerprint image can be sensed in an area relatively larger than an area measured through a single fingerprint sensor.

According to various embodiments, by acquiring curvature information, fingerprint authentication may be deemed successful and confirmed only when an external object (in other words, sample to be authenticated) is an actual finger having a phase and matches with a registered fingerprint image, thereby solving the problem of forgery occurring during fingerprint recognition, and increasing the security of the fingerprint recognition function.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 5A illustrates examples for explaining a principle of a frequency component according to an aperture according to an embodiment of the disclosure;

FIG. 9 illustrates arrangement shapes of multiple optical fingerprint sensors according to an embodiment of the disclosure.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

Figure 1:
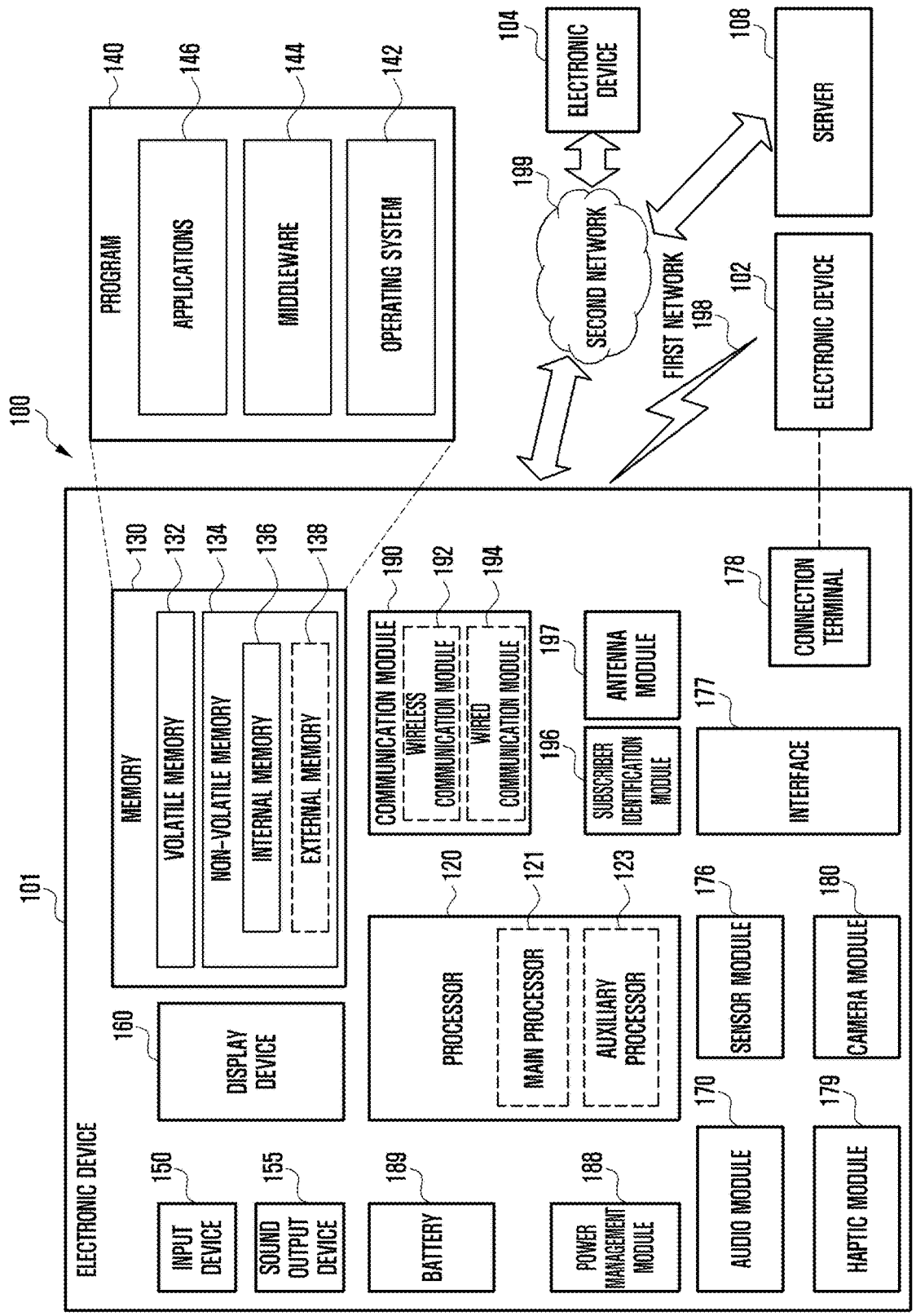
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen.

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102 and 104 or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
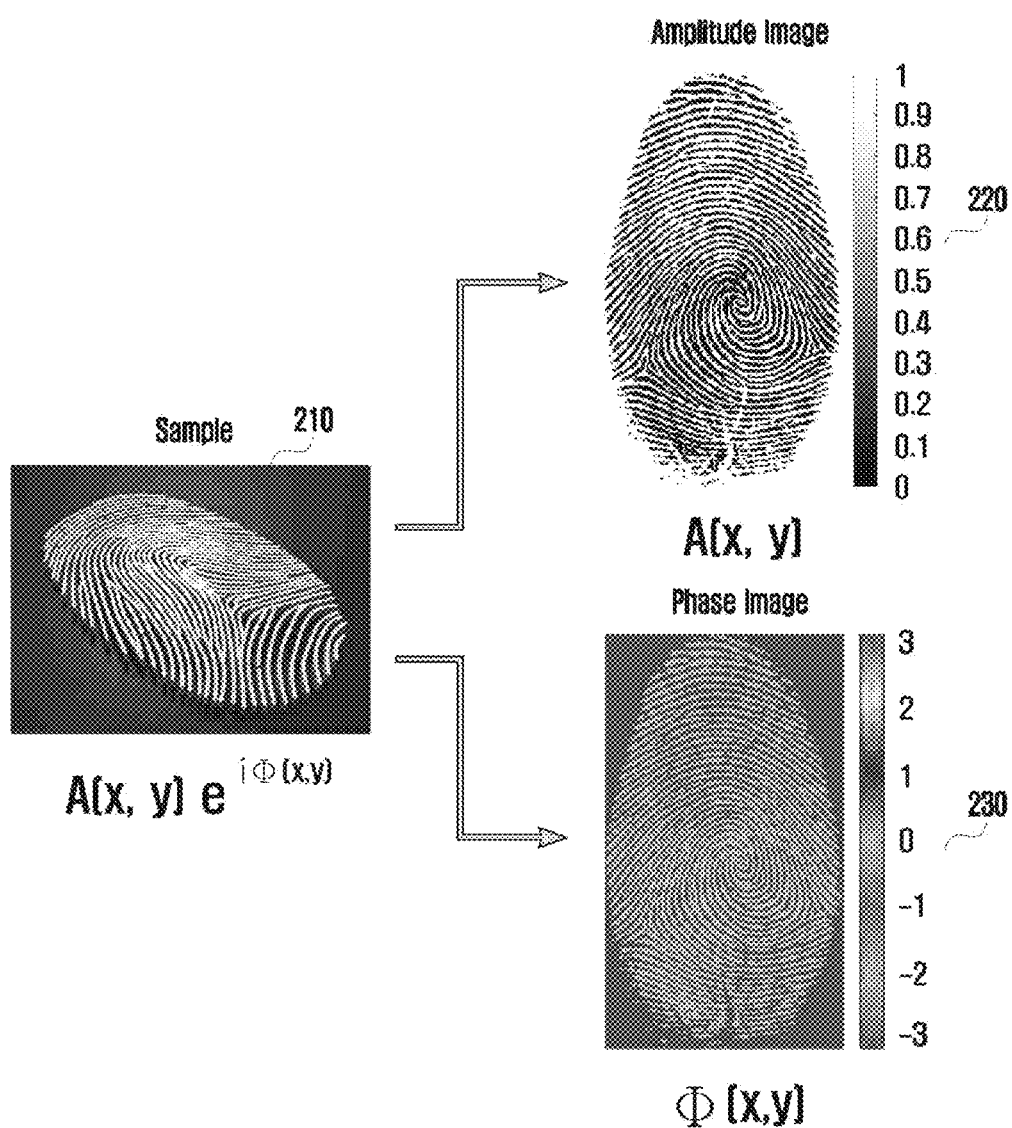
FIG. 2 is a view illustrating an amplitude component and a phase component according to an embodiment of the disclosure.

FIG. 2 is a view illustrating an amplitude component and a phase component according to an embodiment of the disclosure.

Referring to FIG. 2, according to an embodiment, a sample (e.g., a fingerprint) 210 used for fingerprint recognition may have a three-dimensional shape including a ridge and a valley of a fingerprint.

The sample (that is, an external object requesting authentication; e.g., the fingerprint) 210 may include amplitude (A(x, y)) information indicating a light amount difference (e.g., a reflection rate or transmittance) between a ridge and valley part of a fingerprint, and phase ($\phi$(x, y)) information indicating curvature (or depth) or thickness information in a ridge and valley part of a fingerprint. The information of the sample 210 may be represented by $A(x, y)e^{i\Phi(x, y)}$ which indicates amplitude information and phase information. Ideally, the information of the sample 210 may be separated into an amplitude image 220 indicating amplitude information and a phase image 230 indicating phase information.

However, an optical fingerprint sensor includes a light detector (or a light detecting element of an image sensor) for detecting light, and the light detector may detect only power or strength (amplitude) of light. As a result, the optical fingerprint sensor may acquire a fingerprint image (e.g., the amplitude image 220) including only amplitude (A(x, y)) information without phase ($\phi$(x, y)) information.

Acquiring, by an electronic device, the amplitude image 220 from the sample 210 requesting authentication and comparing the amplitude image 220 with fingerprint information registered in the electronic device is substantially identical to performing authentication for a fingerprint surface pattern (e.g., a pattern between a furrow (ridge) and a valley).

In this case, the amplitude image 220 includes only a fingerprint surface pattern (e.g., a pattern between a ridge and a valley), and thus it is impossible to determine, through the amplitude image, whether the sample required to be authenticated is a real finger having a stereoscopic shape or a two-dimensional object which is printed in a fingerprint shape. In other words, even when a fingerprint printed on two-dimensional paper is authenticated by a fingerprint sensor, the electronic device may acquire a fingerprint shape identical to a fingerprint of a real finger, and the risk of unauthorized access may still exist.

Therefore, in case of an electronic device including an optical fingerprint sensor, in order to prevent unauthorized access, a measure may be needed to acquire the phase ($\phi$(x, y)) image 230 indicating curvature information (e.g., a depth) of the sample 210 and determine whether the sample 210 is a stereoscopic pattern or a two-dimensional pattern.

Hereinafter, a description will be given of a method and a device for acquiring an amplitude image and a phase image by using an electronic device according to various embodiments including multiple optical fingerprint sensors and apertures filtering light with complementary components, and using the images for fingerprint authentication.

Figure 3:
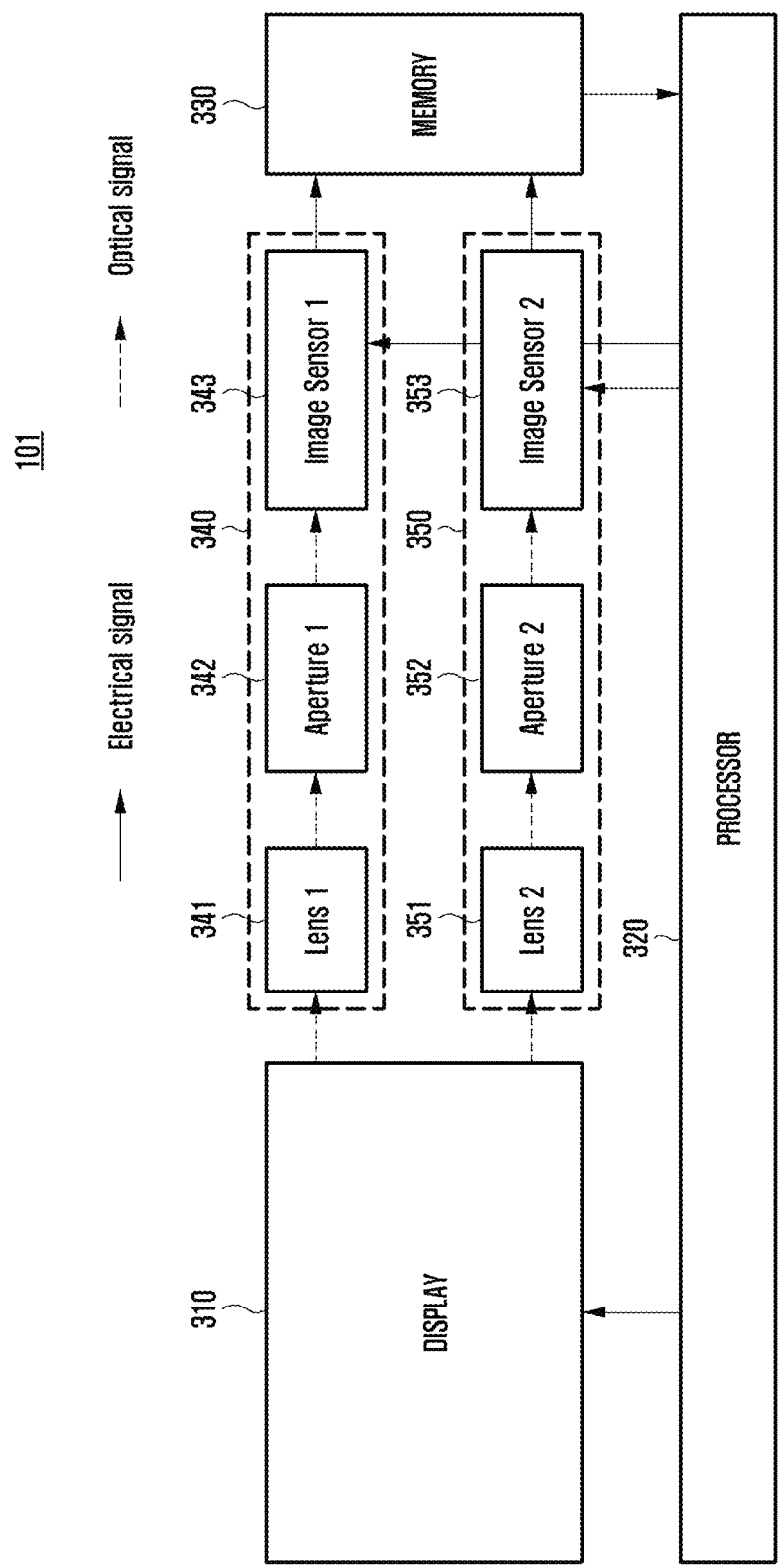
FIG. 3 illustrates a configuration of an electronic device according to an embodiment of the disclosure.

FIG. 3 illustrates a configuration of an electronic device according to an embodiment of the disclosure.

Referring to FIG. 3, an electronic device 101 (e.g., the electronic device 101 of FIG. 1) may include multiple optical fingerprint sensors according to various embodiments.

Only a first fingerprint sensor 340 and a second fingerprint sensor 350 are illustrated in the description of FIG. 3, but are not limited thereto, and at least a portion of third to N-th (e.g., N is a natural number of four or more) fingerprint sensors may be further included to increase the size of a fingerprint detection area.

An electronic device (e.g., the electronic device 101 in FIG. 1) according to an embodiment may include a display 310 (e.g., the display module 160 in FIG. 1), a processor 320 (e.g., the processor 120 in FIG. 1), a memory 330 (e.g., the memory 130 in FIG. 1), the first fingerprint sensor 340 (e.g., the sensor module 176 in FIG. 1), and the second fingerprint sensor 350 (e.g., the sensor module 176 in FIG. 1). The electronic device 101 may include entire or partial components of the electronic device shown in FIG. 1.

The display 310 may be electrically connected to the processor 320 and display various information (e.g., a text, an image, a video, an icon, or a symbol) under the control of the processor 320. The display 310 may display a user interface (UI) screen related to an operation of the electronic device 101. The display 310 may be formed by one of, for example, a liquid crystal display (LCD), a light-emitting diode (LED) display, a quantum dot (QD) display, a micro LED (μLED), an organic light-emitting diode (QLED) display.

According to an embodiment, the display 310 may include a touch screen panel (TSP).

According to an embodiment, the display 310 may display a visual effect (or a guiding object) inducing fingerprint recognition at a fingerprint measurement area (or positions in which the first fingerprint sensor 340 and the second fingerprint sensor 350 are disposed). When a fingerprint authentication process is activated, the electronic device 101 may induce a user to perform fingerprint authentication by displaying a visual effect on the display 310 corresponding to the fingerprint measurement area (or an activated area).

According to an embodiment, the display 310 may be used as a light source for the first fingerprint sensor 340 and the second fingerprint sensor 350. For example, the processor 320 may transfer, to the display 310, a drive signal for causing partial pixels disposed to correspond to the fingerprint measurement area of the display 310 to emit light, and control the display 310 to be used as a light source for the first fingerprint sensor 340 and the second fingerprint sensor 350.

According to an embodiment, the light source for the first fingerprint sensor 340 and the second fingerprint sensor 350 may be disposed in the electronic device 101 as a separate component.

The first fingerprint sensor 340 and the second fingerprint sensor 350 may detect an external object (e.g., a user finger) brought into contact with the display 310, and acquire a fingerprint image (or fingerprint information) indicating characteristics of the fingerprint. The first fingerprint sensor 340 and the second fingerprint sensor 350 may be implemented as an optical fingerprint sensor.

For example, the first fingerprint sensor 340 may include a first lens 341, a first aperture 342, and a first image sensor 343, and the second fingerprint sensor 350 may include a second lens 351, a second aperture 352, and a second image sensor 353.

The first fingerprint sensor 340 may collect an optical signal of light reflected by an external object (e.g., a finger) through the first image sensor 343 via the first lens 341 and the first aperture 342, the optical signal may be converted into an electrical signal in the first image sensor 343, and a first fingerprint image (e.g., first fingerprint data or first fingerprint information) corresponding to the external object may be transferred to the processor 320.

The second fingerprint sensor 350 may collect an optical signal of light reflected by the same external object (e.g., the finger) through the second image sensor 353 via the second lens 351 and the second aperture 352, the optical signal may be converted into an electrical signal in the second image sensor 353, and a second fingerprint image (e.g., second fingerprint data or second fingerprint information) corresponding to the external object may be transferred to the processor 320.

According to an embodiment, the first fingerprint sensor 340 and the second fingerprint sensor 350 may be disposed so that at least a portion of sensing areas overlaps. The first fingerprint image acquired by the first fingerprint sensor 340 and the second fingerprint image acquired by the second fingerprint sensor 350 may have at least a portion (hereinafter, a duplicate area) overlapping each other.

The first aperture 342 and the second aperture 352 may be implemented in shapes complementary to each other. When the first aperture 342 is designed to filter light with a first component, the second aperture 352 may be designed to filter light with a second component complementary to the first component. For example, when the first component is a negative directional (−k) component in a Fourier domain, the second component may be a positive directional (+k) component in the Fourier domain.

The first lens 341 and the second lens 351 may be implemented to have a magnification of about ¼ to ⅐ according to a configuration of a lens. The sensing areas of the fingerprint sensors may be implemented as an area about 4 to 7 times larger than the size of the fingerprint sensor.

The first fingerprint sensor 340 and the second fingerprint sensor 350 may be arranged in a structure for fingerprint recognition (e.g., fingerprint on display or in-display fingerprint) on the display 310. For example, the first fingerprint sensor 340 and the second fingerprint sensor 350 may be arranged on a portion of the rear surface (that is, when the front surface to which information is display in the display is +Z axis, the rear surface is −Z axis) (e.g., an under panel) of the display 310, or may be arranged in a display module as an integral shape (e.g., an in-display sensor) with the display 310.

According to an embodiment, the electronic device 101 may increase the size of the fingerprint measurement area by arranging multiple fingerprint sensor in addition to the first fingerprint sensor 340 and the second fingerprint sensor 350. For example, multiple fingerprint sensors may be arranged so that fingerprint measurement may be performed in anywhere in the whole area (or ½ area) of the display.

The memory 330 may include a volatile memory and a non-volatile memory. The memory 330 may be disposed in a housing to be electrically connected to the processor 320.

The memory 330 may store fingerprint authentication data registered (for preconfigured) for user authentication. For example, the fingerprint authentication data may be stored in a security area of the memory 330.

The memory 330 may include a register (not shown). While light source (e.g., a portion of pixels in a designated activation area) emits light during fingerprint authentication, the register may store (or record) a fingerprint image (e.g., the first fingerprint image, the second fingerprint image, a combined image, and a phase image), based on a signal of reflection light reflected from an external object through an image sensor.

The memory 330 may store various instructions performable in the processor 320, operations of the processor 320 to be described below may be performed by loading the instructions stored in the memory 330.

The processor 320 may perform control of each component of the electronic device 101 and/or calculation or data process related to communication.

According to an embodiment, the processor 320 may control a light-emitting operation of a designated light source and a sensing operation of the first fingerprint sensor 340 and the second fingerprint sensor 350 to be synchronized, and perform image processing based on a signal transferred from the first fingerprint sensor 340 and the second fingerprint sensor 350 to acquire (or reconstruct) a first fingerprint image and a second fingerprint image.

According to an embodiment, the processor 320 may produce a combined image of the first fingerprint image and the second fingerprint image, and compare the combined image with fingerprint authentication data stored in the memory 330 to determine whether the user is a user having authority. For example, the processor 320 may process a redundant pattern in a duplicate area of the first fingerprint image and the second fingerprint image to produce a combined image combined in one.

According to an embodiment, the processor 320 may compare the first fingerprint image with fingerprint authentication data or compare the second fingerprint image with fingerprint authentication data to determine whether the user is a user having authority.

According to an embodiment, the processor 320 may produce a phase image by using a differential component in a duplicate area of the first fingerprint image and the second fingerprint image and identify whether the produced phase image is an image having contrast to determine whether the object requesting authentication is a stereoscopic image.

According to an embodiment, the processor 320 may control fingerprint authentication to succeed when the combined image matches with the registered fingerprint authentication data and the phase image has contrast, and may control fingerprint authentication to fail when the combined image does not match with the registered fingerprint authentication data or the phase image is not an image having contrast.

Figure 4A:
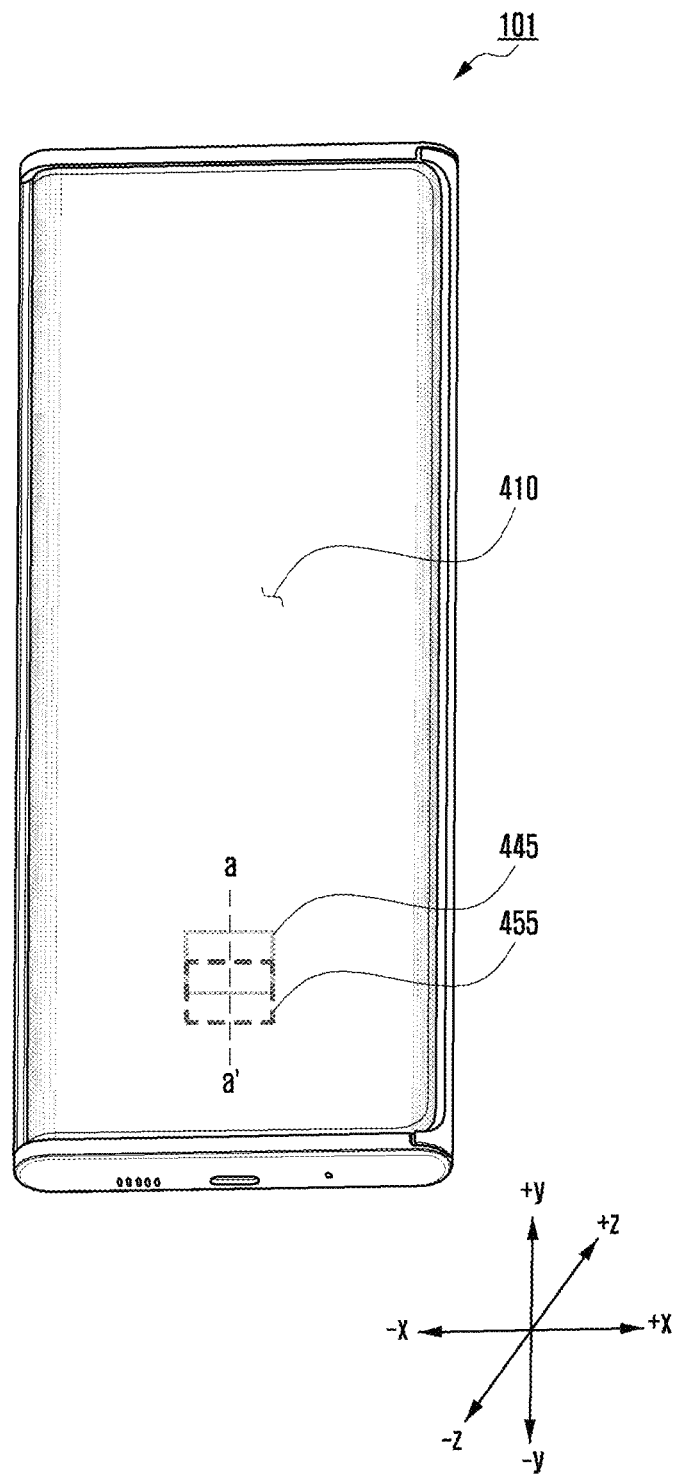
FIG. 4A illustrates multiple optical fingerprint sensors of an electronic device according to an embodiment of the disclosure.
Figure 4B:
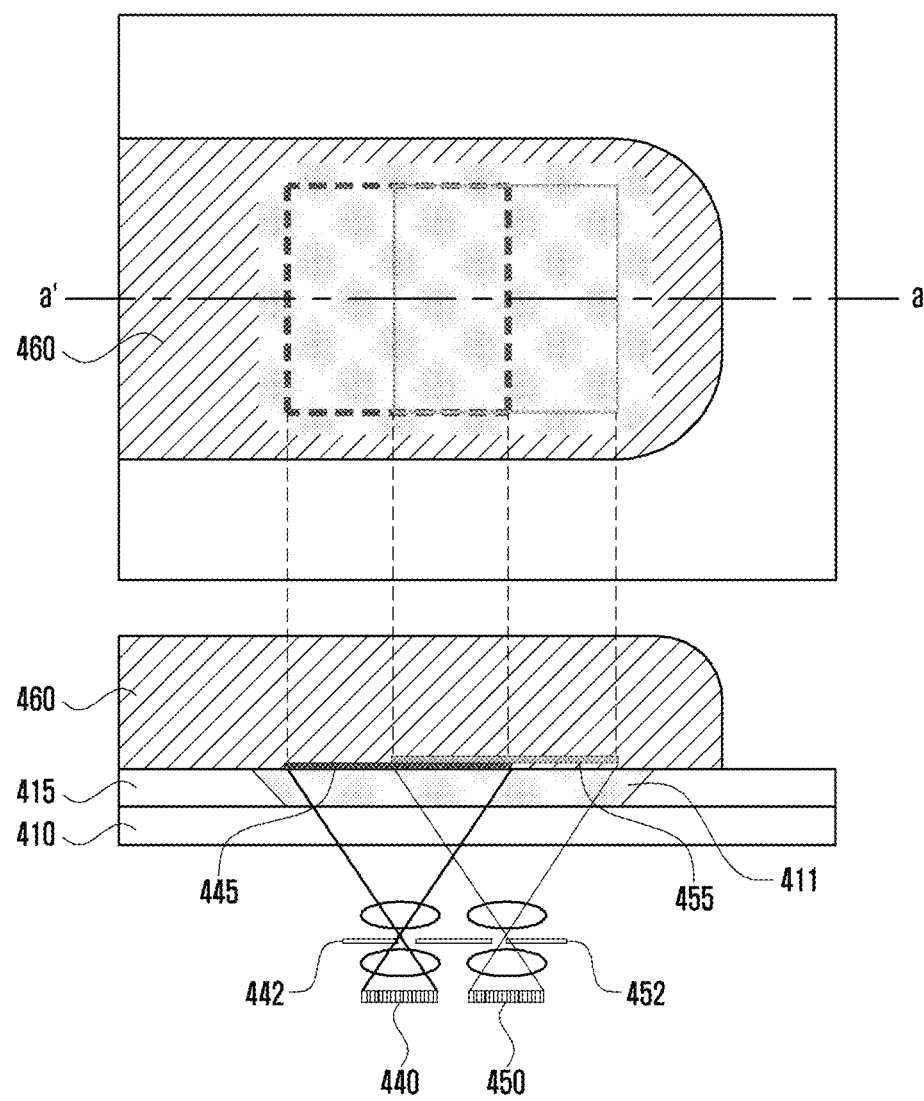
FIG. 4B illustrates a planar view and a sectional view taken along a-a' of multiple optical fingerprint sensors according to an embodiment of the disclosure.

FIG. 4A illustrates multiple optical fingerprint sensors of an electronic device according to an embodiment of the disclosure, and FIG. 4B illustrates a planar view and a sectional view taken along a-a' of multiple optical fingerprint sensors according to an embodiment of the disclosure.

Referring to FIGS. 4A and 4B, according to an embodiment, multiple optical fingerprint sensors (e.g., a first fingerprint sensor 440 (e.g., the first fingerprint sensor 340 in FIG. 3) and a second fingerprint sensor 450 (e.g., the second fingerprint sensor 350 in FIG. 3)) may be arranged on an area (e.g., the fingerprint measurement area) of the lower end (or the rear surface) (e.g., −Z-axis direction) of a display 410 (e.g., the display 310 in FIG. 3). According to an embodiment, the multiple optical fingerprint sensors (e.g., the first fingerprint sensor 440 and the second fingerprint sensor 450) may be arranged so that at least a portion of sensing areas (e.g., a first sensing area 445 and a second sensing area 455) overlaps. For example, the first sensing area 445 of the first fingerprint sensor 440 and the second sensing area 455 of the second fingerprint sensor 450 may be arranged so that at least a portion thereof overlaps. The first sensing area 445 and the second sensing area 455 are an area activated for fingerprint authentication, and the first sensing area 445 and the second sensing area 455 may be referred to as a fingerprint measurement area together. The first fingerprint sensor 440 and the second fingerprint sensor 450 may be formed on the rear surface of the display 410 and may not be visually recognized by a user. The electronic device 101 may display a visual effect (not shown) for guiding a user to bring a finger into contact with the fingerprint measurement area in response to a fingerprint recognition function activation request.

By arranging the multiple optical fingerprint sensors, the electronic device 101 may acquire a fingerprint image in an area relatively larger than an area used for a single fingerprint sensor.

A window (or a cover window) 415 may be disposed on the front surface (or the upper end) (e.g., +Z-axis direction) of the display 410. The window 415 may be formed of a transparent material for allowing light to penetrate and may be formed to protect the display 410 from an external impact.

During fingerprint sensing, the electronic device 101 may produce light by using a light source 411 (e.g., a light-emitting element of a display) and collect reflection light of an external object (e.g., a user finger) 460 positioned at the upper end of the window 415 through the first fingerprint sensor 440 and the second fingerprint sensor 450.

For example, the emitted light may penetrate through the display 410 and the window 415 to be irradiated outside. The first sensing area 445 and the second sensing area 455 may be determined by the size and magnification of the first fingerprint sensor 440 and the second fingerprint sensor 450.

The electronic device 101 may adjust the size of a light-emitting area in the display to cause an irradiation area of the light source to cover the first sensing area 445 and the second sensing area 455. The light reflected from the external object 460 may be collected through a light detector (or an image sensor) via a first aperture 442 of the first fingerprint sensor 440 and a second aperture 452 of the second fingerprint sensor 450.

The first aperture 442 and the second aperture 452 may serve to block the rest components other than necessary light components. The first aperture 442 and the second aperture 452 may serve to distinguish (+) component and (−) component with reference to a specific axis in a frequency domain.

According to an embodiment, the first aperture 442 and the second aperture 452 may be designed in shapes complementary to each other. For example, when the first aperture 442 is designed to filter light with a first component with reference to a specific axis, the second aperture 452 may be designed to filter light with a second component complementary to the first component. For example, when the first component is a negative directional (−k) component with reference to a specific axis in a Fourier domain, the second component may be a positive directional (+k) component in the Fourier domain. Here, the specific axis may be an x-axis or y-axis, but, without limitation thereto, may be an axis having a predetermined direction.

The first fingerprint sensor 440 may acquire a first fingerprint image (e.g., amplitude 1) including amplitude information corresponding to the first sensing area 445, and the second fingerprint sensor 450 may acquire a second fingerprint image (e.g., amplitude 2) including amplitude information corresponding to the second sensing area 455.

Since the first sensing area 445 and the second sensing area 455 partially overlap, the electronic device 101 may combine the first fingerprint image and the second fingerprint image to produce a combined image. For example, the processor 120 may process a redundant portion in a duplicate area of the first fingerprint image and the second fingerprint image to produce a combined image combined in one. The combined image may be an image corresponding to a fingerprint measurement area including an entirety of the first sensing area 445 and the second sensing area 455.

The first fingerprint image and the second fingerprint image include information of light which has been filtered in a direction complementary to each other in a spatial frequency with respect to the same external object 460, and thus the electronic device 101 may produce a phase image by using a differential component in the duplicate area.

Hereinafter, a description will be given of a principle for producing a phase image according to a frequency component.

Figure 5B:
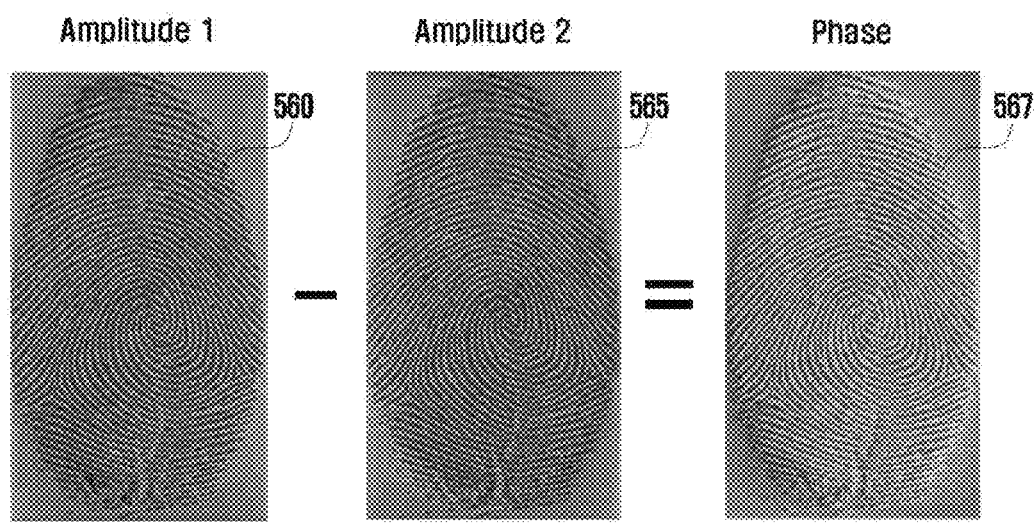
FIG. 5B illustrates an example of phase images according to an embodiment of the disclosure.
Figure 5B:
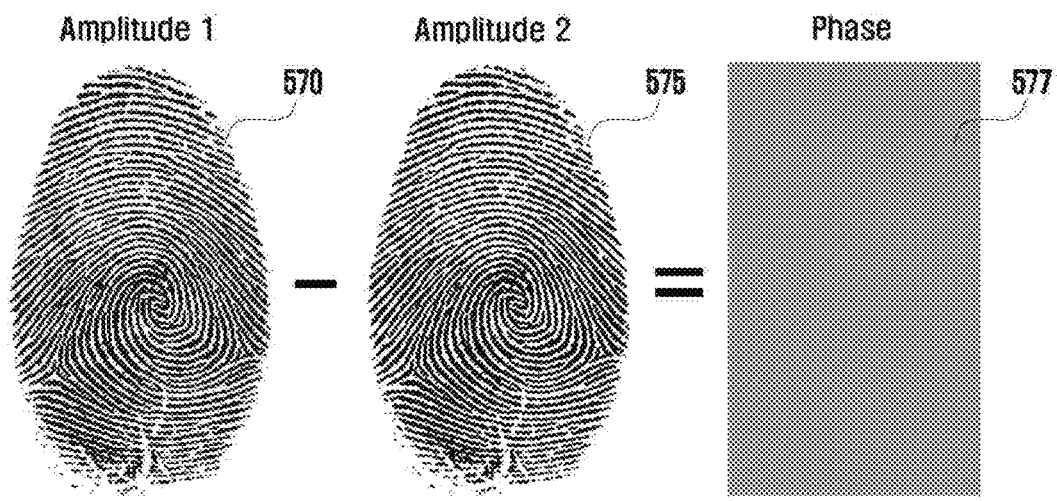

FIG. 5A illustrates examples for explaining a principle of a frequency component according to an aperture according to an embodiment of the disclosure, and FIG. 5B illustrates an example of phase images according to an embodiment of the disclosure.

Referring to FIGS. 5A and 5B, according to an embodiment, a first aperture 530 (e.g., the first aperture 442 in FIG. 4B) and a second aperture 535 (e.g., the second aperture 452 in FIG. 4B) may be designed to filter light with complementary components. For example, the first aperture 530 may be designed to have a first shape through which only spatial frequency information of (−) component in the Fourier domain may pass, and the second aperture 535 may be designed to have a second shape through which only spatial frequency information of (+) component in the Fourier domain may pass.

An external object 510 (e.g., a fingerprint sample) having a three-dimensional shape may be expressed as a complex expression, $A(x, y)e^{i\Phi(x, y)}$ including not only amplitude information but also phase information.

Reflection light reflected from the external object 510 may have a characteristic of a three-dimensional object, that is $A(x, y)e^{i\Phi(x, y)}$ and may be incident to a lens 515.

When the light incident to the lens 515 may be subject to Fourier-transform and defined as $F\{A \cdot e^{i\Phi}\}$ 520, a light 540 having passed according to the shape of the first aperture 530 may be defined as $F^{-1}[F\{A \cdot e^{i\Phi}\} \times \text{aper1}]$ which some frequency components are blocked.

The light 540 of a component filtered by the first aperture 530 among components having passed the lens 515 may be subject to inverse Fourier transform through another lens (e.g., a tube lens) 550 so as to be changed to an image domain and transferred to a light detector (or an image sensor) (not shown) (e.g., the first fingerprint sensor 440 in FIG. 4B). Here, the light having been through the inverse Fourier transform may be defined as $F^{-1}[F\{A \cdot e^{i\Phi}\} \times \text{aper1}]$.

On the contrary, a light 545 passing according to a shape of the second aperture 535 formed in the lens 515 may be defined as $F\{A \cdot e^{i\Phi}\} \times \text{aper2}$, and the light 545 of an component filtered by the second aperture 535 may be subject to inverse Fourier transform through another lens (e.g., a tube lens) 555 so as to be changed into an image domain, $F\{A \cdot e^{i\Phi}\} \times \text{aper2}$, and transferred to a light detector (or an image sensor) (not shown) (e.g., the second fingerprint sensor 450 in FIG. 4B).

The light detector (or an image sensor) according to an embodiment detects only an amplitude component in $F^{-1}[F\{A \cdot e^{i\Phi}\} \times \text{aper2}]$ component which is a complex component reaching the light detector, and thus the first fingerprint sensor may acquire a first fingerprint image (e.g., amplitude 1) 560 corresponding to amplitude information of the first sensing area and the second fingerprint sensor may acquire a second fingerprint image (e.g., amplitude 2) 565 corresponding to amplitude information of the second sensing area.

For example, when Fourier domain information of a first component (e.g., −k component) filtered through the first aperture 530 is c1, the first fingerprint image (e.g., amplitude 1) 560 may be represented by Equation 1 below.

$$\text{Amplitude image 1} = \left|\sum c_{1n} e^{-i\vec{k}n \cdot \vec{x}}\right|^2 \quad \text{Equation 1}$$

When Fourier domain information of a second component (e.g., +k component) filtered through the second aperture 535 is c2, the second fingerprint image (e.g., amplitude 2) 565 may be represented by Equation 2 below.

$$\text{Amplitude image 2} = \left|\sum c_{2n} \cdot e^{+i\vec{k}n \cdot \vec{x}}\right|^2 \quad \text{Equation 2}$$

The first fingerprint image (e.g., amplitude 1) 560 may represent information according to reflection light when a fingerprint is irradiated with light in −k direction, and the second fingerprint image (e.g., amplitude 2) 565 may represent information according to reflection light when a fingerprint is irradiated with light in +k direction.

Meanwhile, when the external object 510 is a three-dimensional sample, curvature (or depth) information may change according to a position (x, y) of a ridge and a valley of a fingerprint, and phase information (phase f) of the fingerprint may have a value f(x, y) which is not constant and changes according to the position (x, y).

By way of example, when a three-dimensional object (e.g., $A(x, y)e^{i\Phi(x, y)}$) having a shape including f(x, y) is irradiated with light in one direction, a sensor may acquire a gradient image according to an irradiation direction of light according to f(x, y) which is changes in thickness (or curvature and depth) of the object. For example, when a three-dimensional object (e.g., $A(x, y)e^{i\Phi(x, y)}$) is irradiated with light in opposite directions through two sensors, each sensor may acquire amplitude images (e.g., the first fingerprint image (e.g., amplitude 1) 560 and the second fingerprint image (e.g., amplitude 2) 565) having a shading difference. When a differential component is acquired by using the two amplitude images, the electronic device 101 may acquire a phase image 567 of a phase component, from which a common component has been removed as shown in <A> in FIG. 5B.

A change in shading may occur in reflection light of the external object 510 which is incident from different directions through the first aperture 530 and the second aperture 535 designed to be complementary to each other. Fourier transform functions of the first fingerprint image (e.g., amplitude 1) 560 and the second fingerprint image (e.g., amplitude 2) 565 are not symmetrical to each other, and thus even when a differential component is acquired by removing a common component, the image is not completed counter-balanced and a phase image including only a phase component may be acquired.

On the other hand, as shown in <B> in FIG. 5B, when the object is two-dimensional sample, depth information does not change according to location coordinates (x, y), a phase becomes zero (e.g., f(x, y)=0), and a degree of reflection may be represented by a form of real number A(x, y) according to respective location coordinates. The Fourier transform function of real number A(x, y) may be represented by Equation 3 below.

$$\begin{aligned}\text{Real} &= c_1 e^{-i\vec{k} \cdot \vec{x}} + c_2 e^{+i\vec{k} \cdot \vec{x}} = \\ &c_1\left(\cos\vec{k} \cdot \vec{x} - i\sin\vec{k} \cdot \vec{x}\right) + c_2\left(\cos\vec{k} \cdot \vec{x} + i\sin\vec{k} \cdot \vec{x}\right) = \\ &(c_1 + c_2)\cos\vec{k} \cdot \vec{x} - i(c_1 - c_2)\sin\vec{k} \cdot \vec{x} \quad \therefore c_1 - c_2 = 0\end{aligned} \quad \text{Equation 3}$$

Here, in case of a two-dimensional sample, +k component and −k component are symmetrical to each other, values of c1 and c2 are equal to each other, and thus a first image 570 and a second image 575 corresponding to the two-dimensional sample may acquire a phase image 577 having no contrast.

When c1 and c2 have different values (or a differential component of the first image and the second image has contrast), the electronic device 101 may recognize the fingerprint image as an image acquired from reflection light of an object in a complementary direction and identify that the object requesting authentication is a stereoscopic pattern having a three-dimensional shape.

The electronic device 101 according to an embodiment may acquire the first fingerprint image and the second fingerprint image including amplitude information through reflection light incident from opposite directions through the first aperture 530 and the second aperture 535 designed in a shape complementary to each other and produce a phase image by using a differential component in a duplicate area of the first fingerprint image and the second fingerprint image, so as to determine whether the external object (a sample) has a stereoscopic (or three-dimensional) shape or a two-dimensional shape.

An electronic device 101 according to various embodiments may include a display, a first fingerprint sensor (e.g., the first fingerprint sensor 340 in FIG. 3) disposed at the lower end of the display and including a first aperture (e.g., the first aperture 442 in FIG. 4B and the first aperture 530 in FIG. 5A) configured to filter light with a first component, a second fingerprint sensor (e.g., the second fingerprint sensor 350) which is disposed to have a second sensing area (e.g., the second sensing area 455 in FIGS. 4A and 4B) at least partially overlapping a first sensing area (e.g., the first sensing area 445 in FIGS. 4A and 4B) of the first fingerprint sensor and includes a second aperture (e.g., the second aperture 452 in FIG. 4B and the second aperture 535 in FIG. 5A) configured to filter light with a second component complementary to the first component, a memory (e.g., the memory 130 in FIG. 1), and a processor (e.g., the processor 120 in FIG. 1) operatively connected to the display (e.g., the display module 160 in FIG. 1), the first fingerprint sensor, the second fingerprint sensor, and the memory, wherein the memory 130 stores instructions configured to cause the processor 120 to acquire a first fingerprint image corresponding to an external object requesting fingerprint authentication through the first fingerprint sensor, acquire a second fingerprint image corresponding to the external object through the second fingerprint sensor, produce a phase image based on a differential component of an area in which the first fingerprint image and the second fingerprint image overlap, identify whether the external object is a stereoscopic pattern having a three-dimensional shape through the phase image, identify whether at least one of the first fingerprint image and the second fingerprint image matches with registered user fingerprint authentication data, and when all conditions that the external object is a stereoscopic pattern and matches with the registered fingerprint authentication data are satisfied, succeed the fingerprint authentication for the external object.

According to various embodiments, the processor 120 may be configured to produce a combined image combined in one by processing a redundant portion of an area in which the first fingerprint image and the second fingerprint image overlap, and identify whether the combined image matches with the registered user fingerprint authentication data.

According to various embodiments, the first fingerprint sensor and the second fingerprint sensor may be designed to recognize a fingerprint through the display.

According to various embodiments, a fingerprint measurement area may be designated to include the second sensing area at least partially overlapping the first sensing area, and the processor 120 may be configured to irradiate a portion of the display corresponding to the fingerprint measurement area with a light source.

According to various embodiments, the first fingerprint sensor and the second fingerprint sensor may include an optical fingerprint sensor, the first fingerprint image may be an amplitude image filtered with the first component by the first aperture in a light component reflected from the external object, and the second fingerprint image may be an amplitude image filtered with the second component by the second aperture in a light component reflected by the external object.

According to various embodiments, the first component may be a negative directional component with reference to a specific axis in a spatial frequency domain, the second component may be a positive directional component with reference to the specific axis, and the specific axis may be one of an x-axis, a y-axis, or an axis having a predetermined direction.

According to various embodiments, the first aperture may be designed to pass light through a hole area having a first shape and block light in other areas, and the second aperture may be designed to pass light through a hole area having a second shape symmetrical to the first shape and block light in other areas.

According to various embodiments, the processor 120 may be configured to acquire a first duplicate area of the first sensing area, acquire a second duplicate area of the second sensing area, and identify a value acquired by subtracting the first duplicate area and the second duplicate pixel by pixel, thereby acquiring the phase image.

The processor 120 according to various embodiments may be configured to determine that the external object is a stereoscopic pattern when the phase image has contrast and determine that the external object is a two-dimensional pattern when the phase image has no contrast to cause the authentication to be failed.

According to various embodiments, the processor 120 may be configured to cause the authentication to be failed when at least one of the first fingerprint image and the second fingerprint image does not match with the registered user fingerprint authentication data.

The electronic device 101 according to various embodiments may further include at least one third fingerprint sensor and fourth fingerprint sensor, and the third fingerprint sensor and the fourth fingerprint sensor are arranged to at least partially overlap with each other but not to intersect with the duplicate area of the first fingerprint sensor and the second fingerprint sensor.

Figure 6:
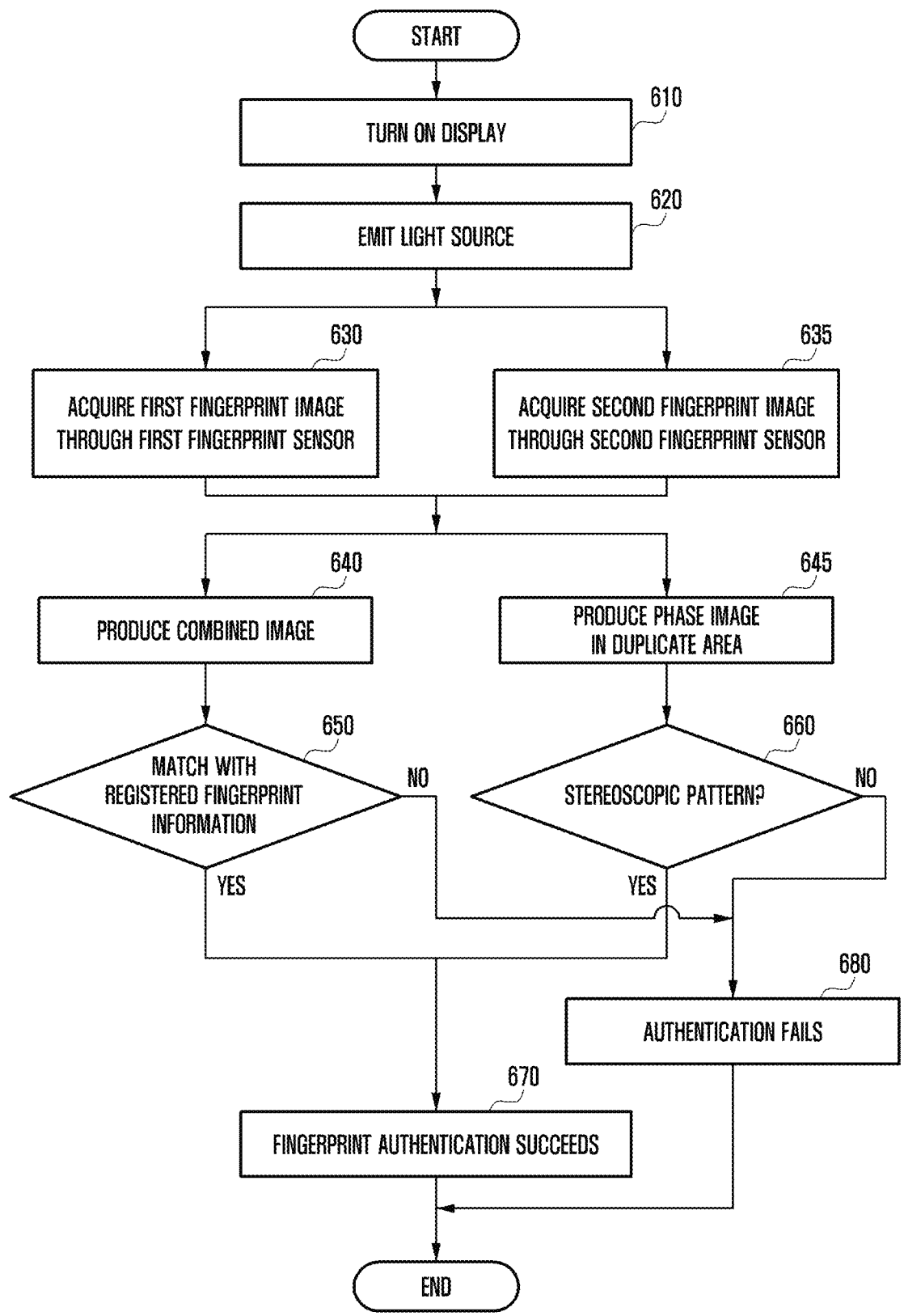
FIG. 6 illustrates a method for acquiring fingerprint information by an electronic device including multiple optical fingerprint sensors according to an embodiment of the disclosure.
Figure 7:
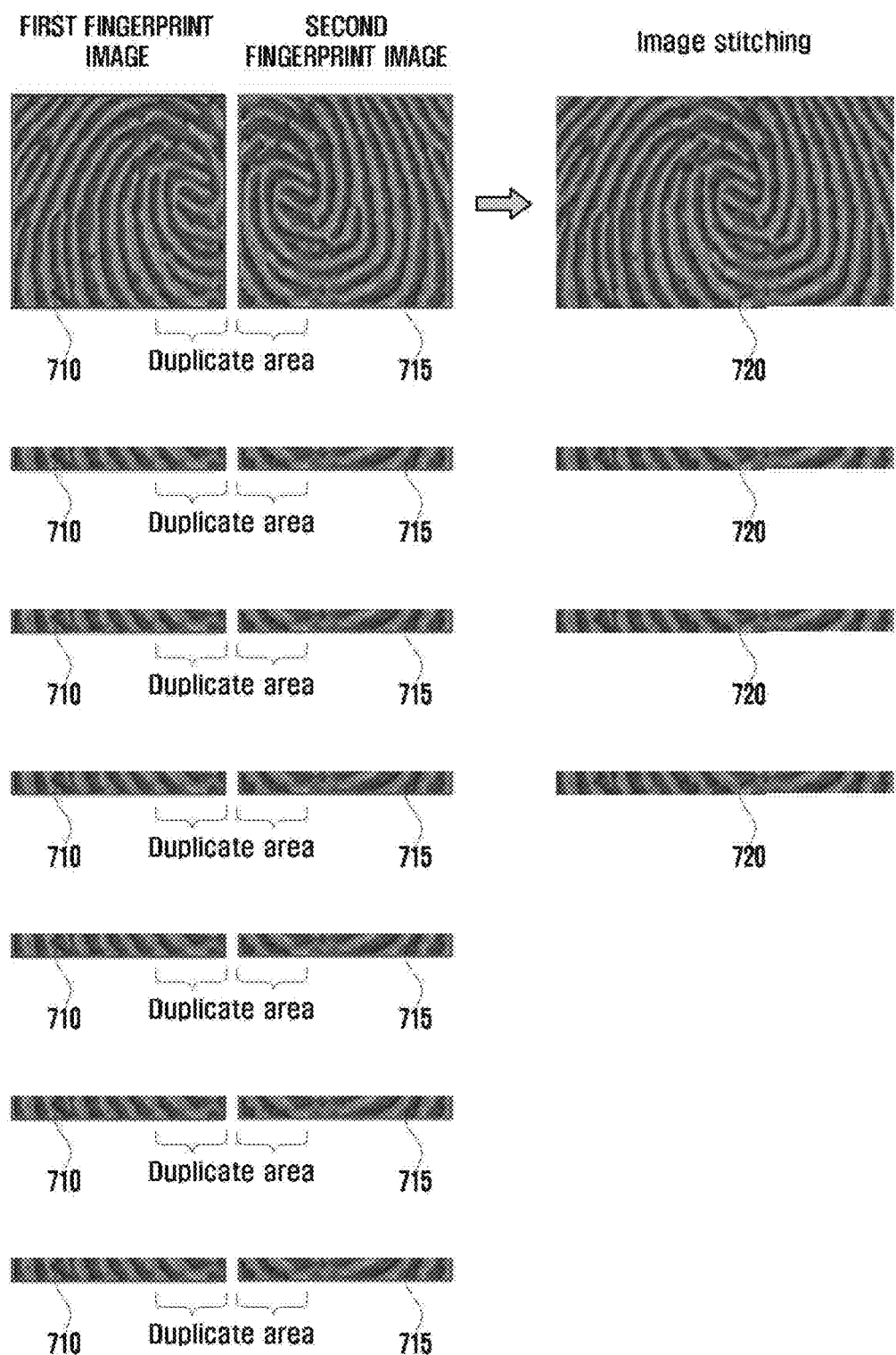
FIG. 7 illustrates a combined image and a phase image according to an embodiment of the disclosure.

FIG. 6 illustrates a method for acquiring fingerprint information by an electronic device including multiple optical fingerprint sensors according to an embodiment of the disclosure, and FIG. 7 illustrates a combined image and a phase image according to an embodiment of the disclosure.

Referring to FIGS. 6 and 7, according to an embodiment, a processor (e.g., the processor 120 in FIG. 1 and the processor 320 in FIG. 3) of an electronic device (e.g., the electronic device 101 in FIGS. 1 and 3) may turn on multiple optical fingerprint sensors (e.g., the first fingerprint sensor 340 and the second fingerprint sensor 350 in FIG. 3) in response to occurrence of an event related fingerprint recognition, in operation 610.

For example, the processor 320 may activate multiple optical fingerprint sensors (e.g., the first fingerprint sensor 340 and the second fingerprint sensor 350) in response to a request for an application (e.g., a finance application) in which a security function is configured or a request for unlocking of the electronic device 101.

According to an embodiment, the processor 320 may turn on a display (e.g., in case of locked state) (e.g., the display module 160 in FIG. 1 and the display 310 in FIG. 3) as well as the optical fingerprint sensors.

According to an embodiment, the processor 320 may notify the activation state of a fingerprint sensor or display a visual object (e.g., a fingerprint-shaped object) (not shown) configured to induce to perform fingerprint authentication on a portion (that is, a fingerprint measurement area) of the display in which fingerprint sensors (e.g., the first fingerprint sensor and the second fingerprint sensor) are arranged.

According to an embodiment, a first fingerprint sensor and a second fingerprint sensor may be arranged in the electronic device 101 such that a first sensing area of the first fingerprint sensor and a second sensing area of the second fingerprint sensor (e.g., the first sensing area 445 and the second sensing area 455 in FIGS. 4A and 4B) are at least partially overlap with each other. The first fingerprint sensor may include a first aperture (e.g., the first aperture 442 in FIG. 4B) configured to filter light with a first component, and the second fingerprint sensor may include a second aperture (e.g., the second aperture 452 in FIG. 4B) configured to filter light with a second component complementary to the first component. A fingerprint measurement area may refer to the entire area including the first sensing area of the first fingerprint sensor and the second sensing area of the second fingerprint sensor.

In operation 620, the processor 320 may emit light outside by using a light source to acquire reflection light reflected from an external object.

According to an embodiment, the processor 320 may cause a light source (e.g., an LED pixel) of the display to emit light, which is located at an area in which fingerprint sensors (e.g., the first fingerprint sensor and the second fingerprint sensor) are arranged.

The first fingerprint sensor may collect light passing through a light penetration hole of the first aperture (and including a first lens) and reflected from an external object (e.g., a user finger) and transfer a collected signal to the processor 320, and the second fingerprint sensor may collect light passing through a light penetration hole of the second aperture (and including a second lens) and reflected from an external object (e.g., a user finger) and transfer a collected signal to the processor 320.

In operation 630, the processor 320 may acquire a first fingerprint image based on a signal transferred from the first fingerprint sensor. In operation 635, the processor 320 may acquire a second fingerprint image based on a signal transferred from the second fingerprint sensor.

Although not shown in the drawings, when the electronic device 101 further includes at least a portion of a third fingerprint sensor to n-th fingerprint sensor, the processor 320 may acquire multiple fingerprints through a signal acquired from each fingerprint sensor.

The processor 320 may distinguish a strength difference of light (or difference in reflection amount) generated from a ridge portion and a valley portion of a fingerprint and change the strength difference in light into a ridge and valley shape so as to acquire the first fingerprint image and the second fingerprint image corresponding to the fingerprint shape.

In operation 640, the processor 320 may process a redundant portion of the first fingerprint image and the second fingerprint image to produce a combination image combined in one.

As shown in FIG. 7, as the sensing areas of the first fingerprint sensor and the second fingerprint sensor partially overlap, a first fingerprint image 710 and a second fingerprint image 715 may include a duplicate area in which a portion thereof overlaps. The processor 320 may process a redundant portion by matching with a first duplicate area 730 included in the first fingerprint image 710 and a second duplicate area 735 included in the second fingerprint image 715 and then produce a combined image 720 combined in one.

For example, the processor 320 may produce the combined image 720 in a manner of removing (or cut out) a duplicate area among from the first fingerprint image 710 and the second fingerprint image 715, and combining them. For another example, the processor 320 may produce the combined image 720 in a manner of combining a duplicate area among from the first fingerprint image 710 and the second fingerprint image 715 while variably giving weighting. The method for producing a combined image is not limited thereto and the combined image 720 may be produced in various manners.

In operation 650, the processor 320 may determine whether an external object attempting authentication matches with an authenticated user fingerprint by comparing the combined image with registered fingerprint authentication data.

According to an embodiment, operation 640 may be omitted and when operation 640 is omitted, the processor 320 may determine whether an external object matches with the authenticated user fingerprint by comparing the first fingerprint image with the registered fingerprint authentication data or comparing the second fingerprint image with the registered fingerprint authentication data.

Operation 645 and operation 660 may be performed with operation 640 and operation 650 in parallel or independently.

In operation 645, the processor 320 may produce a phase image by using a differential component in a duplicate area of the first fingerprint image and the second fingerprint image.

As shown in FIG. 7, the processor 320 may identify the first duplicate area 730 in the first fingerprint image 710 and the second duplicate area 735 in the second fingerprint image 715. The processor 320 may acquire the phase image 740 corresponding to the duplicate areas by acquiring a differential component of the first duplicate area 730 and the second duplicate area 735. For example, the processor 320 may acquire the phase image 740 corresponding to the duplicate areas by subtracting the first duplicate area 730 and the second duplicate area 735 pixel by pixel.

Meanwhile, when the electronic device 101 acquires the differential component, as shown in FIG. 5B, fingerprint images by a three-dimensional object may be acquired as a contrast image according to a ridge direction (e.g., the first aperture and the second aperture have complementary shapes in a left-right direction) of a fingerprint, but fingerprint images of a two-dimensional object may be acquired as an image having no contrast due to a differential component.

In operation 660, the processor 320 may determine whether an external object attempting authentication has a stereoscopic pattern based on the phase image.

According to an embodiment, the processor 320 may determine that the external object is a stereoscopic pattern when the phase image acquired by using a differential component in a duplicate area is an image having contrast and determine that the external object is a two-dimensional pattern not a stereoscopic pattern when the phase image is an image having no contrast.

In operation 670, the processor 320 may succeed in fingerprint authentication when a condition that an external object matches with the registered fingerprint information in operation 650 and a condition that the external object is determined to be a stereoscopic pattern in operation 660 are satisfied.

By way of example, when the fingerprint authentication succeeds, the processor 320 may unlock the electronic device 101 and permit to access to a function, resource, or application requiring security.

In operation 680, the processor 320 may fail in fingerprint authentication and terminate a fingerprint authentication operation when an external object does not match with the registered fingerprint information in operation 650 and the external object is determined not to be a stereoscopic pattern in operation 660.

Figure 8:
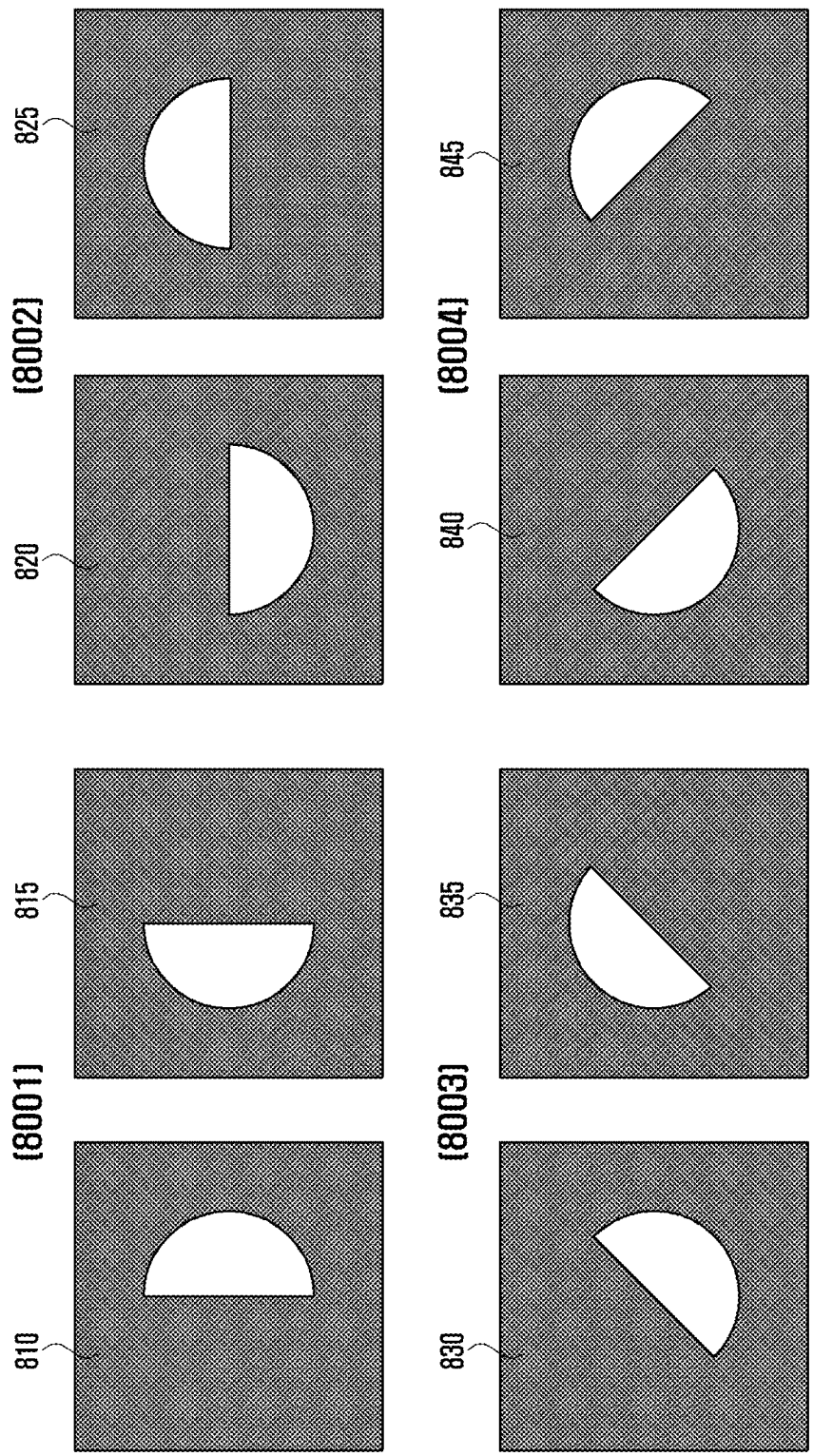
FIG. 8 illustrates an arrangement shape of apertures according to an embodiment of the disclosure.

FIG. 8 illustrates an arrangement shape of apertures according to an embodiment of the disclosure.

Referring to FIG. 8, according to various embodiments, apertures (e.g., the first aperture 342 and the second aperture 352 in FIG. 3) included in multiple optical fingerprint sensors may be designed to have a complementary structure in various shapes.

Changes in a depth direction of a three-dimensional object in a phase image may cause a difference in contrast in other directions according to a shape of apertures.

For example, when a first aperture 810 and a second aperture 815 are arranged in a structure shown in reference numeral 8001, the phase image acquired by a differential component of the first image and the second image may show presence or absent of depth difference in a left-right direction as a contrast change.

For another example, when a first aperture 820 and a second aperture 825 are arranged in a structure shown in reference numeral 8002, the phase image acquired by a differential component of the first image and the second image may show presence or absence of depth difference in an upward-downward direction as a contrast change.

For still another example, like a structure shown in reference numeral 8003, a first aperture 830 and a second aperture 835 may be designed to be complementary to each other, a first aperture 840 and a second aperture 845 may be arranged to have complementary structures as shown in reference numeral 8004, but are not limited thereto, and in case of complementary structure, the first aperture and the second aperture may also be designed in a predetermined direction.

FIG. 9 illustrates arrangement shapes of multiple optical fingerprint sensors according to an embodiment of the disclosure.

Referring to FIG. 9, an electronic device (e.g., an electronic device 101 in FIGS. 1 and 3) may arrange multiple optical fingerprint sensors (e.g., a first fingerprint sensor 340 and a second fingerprint sensor 350 in FIG. 3) in various shapes.

For example, the electronic device 101 may reduce possibility of not presenting phase information due to the same alignment direction of apertures for acquiring a phase image, and arrange multiple optical fingerprint sensors to acquire a fingerprint image in an area relatively larger than an area used for a single fingerprint sensor.

As shown in reference numeral 9001, the electronic device 101 may arrange fingerprint sensors such that a first sensing area 910 and a second sensing area 915 are overlap in a first direction, or as shown in reference numeral 9002, may arrange fingerprint sensors such that a first sensing area 920 and a second sensing area 925 are overlap in a second direction.

When four or more optical fingerprint sensors are arranged as shown in reference numeral 9003 and reference numeral 9004, the electronic device 101 may arrange fingerprint sensors in a shape of pairing two fingerprint sensors because two or more sensor areas do not need to overlap according to a structure of apertures. For example, in reference numeral 9003, fingerprint sensors may be arranged such that a duplicate area is formed by pairing a first sensing area 930 and a second sensing area 935, and a duplicate area is formed by pairing a third sensing area 937 and a fourth sensing area 939. In reference numeral 9004, a first sensing area 940 and a second sensing area 941 may be arranged as a pair, and a third sensing area 943 and a fourth sensing area 945 may be arranged as a pair, and a fifth sensing area 947 and a sixth sensing area 949 may be arranged as a pair.

According to various embodiments, a method for acquiring and authenticating fingerprint information by an electronic device comprising multiple optical fingerprint sensors may include acquiring a first fingerprint image corresponding to an external object requesting fingerprint authentication through a first fingerprint sensor disposed at the lower end of a display and comprising a first aperture configured to filter light with a first component, acquiring a second fingerprint image corresponding to the external object requesting fingerprint authentication through a second fingerprint sensor disposed to have a second sensing area at least partially overlapping a first sensing area of the first fingerprint sensor and comprising a second aperture configured to filter light with a second component complementary to the first component, producing a phase image based on a differential component of an area in which the first fingerprint image and the second fingerprint image overlap, identifying whether the external object is a stereoscopic pattern having a three-dimensional shape through the phase image, identifying whether at least one of the first fingerprint image and the second fingerprint image matches with registered user fingerprint authentication data and when a condition that the external object is a stereoscopic pattern and a condition that the registered fingerprint authentication data is matched with are all satisfied, succeeding in the fingerprint authentication for the external object.

According to various embodiments, the identifying whether at least one of the first fingerprint image and the second fingerprint image matches with registered user fingerprint authentication data further comprises producing a combined image combined in one by processing a redundant portion of an area in which the first fingerprint image and the second fingerprint image overlap, and identifying whether the combined image matches with the registered user fingerprint authentication data.

According to various embodiments, the first fingerprint sensor and the second fingerprint sensor may be designed to recognize a fingerprint through the display.

According to various embodiments, a fingerprint measurement area may be designated to include the second sensing area at least partially overlapping the first sensing area.

According to various embodiments, the first aperture is designed to pass light through a hole area having a first shape and block light in other areas, and the second aperture is designed to pass light through a hole area having a second shape symmetrical to the first shape and block light in other areas.

According to various embodiments, the producing the phase image further may include acquiring a first duplicate area of the first sensing area, acquiring a second duplicate area of the second sensing area, and identifying a value acquired by subtracting the first duplicate area and the second duplicate area pixel by pixel, thereby acquiring the phase image.

According to various embodiments, identifying whether the external object is a stereoscopic pattern having a three-dimensional shape may further include determining that the external object is a stereoscopic pattern when the phase image has contrast and determining that the external object is a two-dimensional pattern when the phase image has no contrast and causing the fingerprint authentication to be failed when the external object is a two-dimensional pattern.

According to various embodiments, a method for acquiring and authenticating fingerprint information may further include causing the authentication to be failed when at least one of the first fingerprint image and the second fingerprint image does not match with the registered user fingerprint authentication data.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device #01) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. The term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a display;
   a first fingerprint sensor disposed at a lower end of the display and comprising a first aperture configured to filter light with a first component;
   a second fingerprint sensor having a second sensing area at least partially overlapping a first sensing area of the first fingerprint sensor, the second fingerprint sensor comprising a second aperture configured to filter light with a second component complementary to the first component;
   memory, comprising one or more storage media, storing instructions; and
   one or more processors communicatively to the display, the first fingerprint sensor, the second fingerprint sensor, and the memory,
   wherein the instructions which, when executed by the one or more processors individually or collectively, cause the electronic device to:
     acquire, through the first fingerprint sensor, a first fingerprint image corresponding to an external object requesting fingerprint authentication,
     acquire, through the second fingerprint sensor, a second fingerprint image corresponding to the external object,
     produce a phase image based on a differential component of an area in which the first fingerprint image and the second fingerprint image overlap,
     identify, through the phase image, whether the external object is a stereoscopic pattern having a three-dimensional shape,
     identify whether at least one of the first fingerprint image or the second fingerprint image matches with registered user fingerprint authentication data, and
     based on the external object being the stereoscopic pattern and the registered user fingerprint authentication data matching with the at least one of the first fingerprint image or the second fingerprint image, succeed in the fingerprint authentication for the external object,
   wherein the first aperture passes light through a hole area having a first shape and blocks light in other areas, and
   wherein the second aperture passes light through a hole area having a second shape reversely symmetrical to the first shape and blocks light in other areas.

2. The electronic device of claim 1, wherein the instructions, when executed by the one or more processors individually or collectively, further cause the electronic device to:
   produce a combined image combined in one by processing a redundant portion of an area in which the first fingerprint image and the second fingerprint image overlap, and
   identify whether the combined image matches with the registered user fingerprint authentication data.

3. The electronic device of claim 1, wherein the first fingerprint sensor and the second fingerprint sensor are configured to recognize a fingerprint through the display.

4. The electronic device of claim 3,
wherein a fingerprint measurement area is designated to include the second sensing area at least partially overlapping the first sensing area, and
wherein the instructions, when executed by the one or more processors individually or collectively, further cause the electronic device to irradiate a portion of the display corresponding to the fingerprint measurement area with a light source.

5. The electronic device of claim 1,
wherein the first fingerprint sensor and the second fingerprint sensor comprise an optical fingerprint sensor,
wherein the first fingerprint image comprises an amplitude image filtered with the first component by the first aperture in a light component reflected from the external object, and
wherein the second fingerprint image comprises an amplitude image filtered with the second component by the second aperture in a light component reflected by the external object.

6. The electronic device of claim 5,
wherein the first component comprises a negative directional component with reference to a specific axis in a spatial frequency domain,
wherein the second component comprises a positive directional component with reference to the specific axis, and
wherein the specific axis comprises one of an x-axis, a y-axis, or an axis having a predetermined direction.

7. The electronic device of claim 1, wherein the instructions, when executed by the one or more processors individually or collectively, further cause the electronic device to:
acquire a first duplicate area of the first sensing area,
acquire a second duplicate area of the second sensing area, and
identify a value acquired by subtracting the first duplicate area and the second duplicate area pixel by pixel, thereby producing the phase image.

8. The electronic device of claim 7, wherein the instructions, when executed by the one or more processors individually or collectively, further cause the processor electronic device to:
determine that the external object comprises the stereoscopic pattern based on the phase image having contrast, and
determine that the external object comprises a two-dimensional pattern based on the phase image not having contrast so as to cause the fingerprint authentication to fail.

9. The electronic device of claim 1, wherein the instructions, when executed by the one or more processors individually or collectively, further cause the electronic device to:
fail the fingerprint authentication in response to at least one of the first fingerprint image or the second fingerprint image not matching with the registered user fingerprint authentication data.

10. The electronic device of claim 1, further comprising:
at least one third fingerprint sensor; and
a fourth fingerprint sensor,
wherein the at least one third fingerprint sensor and the fourth fingerprint sensor are arranged to at least partially overlap with each other but not to intersect with a duplicate area of the first fingerprint sensor and the second fingerprint sensor.

11. A method for acquiring and authenticating fingerprint information by an electronic device comprising multiple optical fingerprint sensors, the method comprising:
acquiring a first fingerprint image corresponding to an external object requesting fingerprint authentication through a first fingerprint sensor disposed at a lower end of a display and comprising a first aperture configured to filter light with a first component;
acquiring a second fingerprint image corresponding to the external object requesting fingerprint authentication through a second fingerprint sensor having a second sensing area at least partially overlapping a first sensing area of the first fingerprint sensor, the second fingerprint sensor comprising a second aperture configured to filter light with a second component complementary to the first component;
producing a phase image based on a differential component of an area in which the first fingerprint image and the second fingerprint image overlap;
identifying, through the phase image, whether the external object comprises a stereoscopic pattern having a three-dimensional shape;
identifying whether at least one of the first fingerprint image or the second fingerprint image matches with registered user fingerprint authentication data; and
based on the external object comprising the stereoscopic pattern and the registered user fingerprint authentication data matching with the at least one of the first fingerprint image or the second fingerprint image, succeeding in the fingerprint authentication for the external object,
wherein the first aperture passes light through a hole area having a first shape and blocks light in other areas, and
wherein the second aperture passes light through a hole area having a second shape reversely symmetrical to the first shape and blocks light in other areas.

12. The method of claim 11, further comprising:
producing a combined image combined in one by processing a redundant portion of an area in which the first fingerprint image and the second fingerprint image overlap; and
identifying whether the combined image matches with the registered user fingerprint authentication data.

13. The method of claim 11, wherein the first fingerprint sensor and the second fingerprint sensor are configured to recognize a fingerprint through the display.

14. The method of claim 13, wherein the first fingerprint sensor and the second fingerprint sensor comprise an optical fingerprint sensor.

15. The method of claim 11,
wherein the first component comprises a negative directional component with reference to a specific axis in a spatial frequency domain,
wherein the second component comprises a positive directional component with reference to the specific axis, and
wherein the specific axis comprises one of an x-axis, a y-axis, or an axis having a predetermined direction.

16. The method of claim 11, wherein the producing of the phase image comprises:
acquiring a first duplicate area of the first sensing area;
acquiring a second duplicate area of the second sensing area; and identifying a value acquired by subtracting the first duplicate area and the second duplicate area pixel by pixel, thereby producing the phase image.

17. The method of claim 11, wherein the identifying of whether the external object comprises a stereoscopic pattern having a three-dimensional shape comprises:
   determining that the external object comprises the stereoscopic pattern based on the phase image having contrast and determining that the external object comprises a two-dimensional pattern based on the phase image not having contrast; and
   failing the fingerprint authentication based on the external object comprising the two-dimensional pattern.

18. The method of claim 11, further comprising:
   failing the fingerprint authentication in response to at least one of the first fingerprint image or the second fingerprint image not matching with the registered user fingerprint authentication data.

* * * * *